United States Patent
Milburn (10) Patent No.: US 10,533,491 B1
(45) Date of Patent: Jan. 14, 2020

(54) CONNECTING ASSEMBLY AND TURBOCHARGER INCLUDING THE CONNECTING ASSEMBLY

(71) Applicant: BorgWarner Inc., Auburn Hills, MI (US)

(72) Inventor: Alexander George Milburn, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/362,896

(22) Filed: Mar. 25, 2019

(51) Int. Cl.
  *F02B 37/18* (2006.01)
  *F16K 31/528* (2006.01)

(52) U.S. Cl.
  CPC .......... *F02B 37/186* (2013.01); *F16K 31/528* (2013.01)

(58) Field of Classification Search
  CPC ... F02B 37/186; F16K 31/528; F05D 2220/40
  See application file for complete search history.

(56) References Cited

U.S. PATENT DOCUMENTS

| | | | |
|---|---|---|---|
| 9,243,549 B2* | 1/2016 | Hinkelmann | F01D 17/105 |
| 9,562,468 B2* | 2/2017 | Werstat | F01D 17/105 |
| 10,072,564 B2 | 9/2018 | Yasoshima et al. | |
| 10,087,826 B2* | 10/2018 | Keller | F02B 37/186 |
| 10,156,184 B2* | 12/2018 | Folk | F01D 17/105 |
| 2007/0271917 A1* | 11/2007 | Vogt | F02B 37/183 60/600 |
| 2017/0058762 A1* | 3/2017 | Marques | F02B 37/186 |
| 2018/0223727 A1 | 8/2018 | Nakajima | |
| 2019/0136762 A1* | 5/2019 | Jones | F01D 17/145 |

FOREIGN PATENT DOCUMENTS

| | | |
|---|---|---|
| EP | 3139017 B1 | 7/2018 |
| JP | 2018127989 A | 8/2018 |
| WO | 2018159318 A1 | 9/2018 |

OTHER PUBLICATIONS

English language abstract and machine-assisted English translation for JP 2018-127989 extracted from espacenet.com database on Apr. 18, 2019, 34 pages.
English language abstract and machine-assisted English translation for WO 2018/159318 extracted from espacenet.com database on Apr. 18, 2019, 28 pages.

* cited by examiner

*Primary Examiner* — Jesse S Bogue
(74) *Attorney, Agent, or Firm* — Howard & Howard Attorneys PLLC (57) ABSTRACT

A connecting assembly includes an actuator connecting rod defining a rod aperture, configured to be coupled to an actuator, and moveable between first and second rod positions by the actuator. The connecting assembly also includes a lever arm coupled to the actuator connecting rod, defining a lever aperture, configured to be coupled to a wastegate valve, and moveable between first and second arm positions by the actuator connecting rod. The connecting assembly further includes a pin having a first pin portion disposed in one of the rod and lever apertures and having a first diameter, a second pin portion disposed in the other of the rod and lever apertures and having a second diameter larger than the first diameter, and a third pin portion having a third diameter larger than the first and second diameters to allow pivotable movement between the actuator connecting rod and the lever arm.

22 Claims, 6 Drawing Sheets

CONNECTING ASSEMBLY AND TURBOCHARGER INCLUDING THE CONNECTING ASSEMBLY

BACKGROUND OF THE INVENTION

1. Field of the Invention

The present invention relates generally to a connecting assembly for controlling flow of exhaust gas from an internal combustion engine, and to a turbocharger including the connecting assembly.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in the vehicle reduces the mass and aerodynamic frontal area of the vehicle, which helps reduce fuel consumption of the internal combustion engine and improve fuel economy of the vehicle.

Typical turbochargers include a turbine housing, which includes an interior surface defining a turbine housing interior. The interior surface extends between a turbine housing inlet and a turbine housing outlet. The turbine housing inlet is defined at one end of the interior surface and is in fluid communication with the internal combustion engine and the turbine housing interior for delivering exhaust gas from the internal combustion engine to the turbine housing interior. The turbine housing outlet is defined at an opposite end of the interior surface and is in fluid communication with the turbine housing interior for discharging exhaust gas from the turbine housing interior.

In many conventional turbochargers, an actuator is coupled to the turbine housing and an actuatable member is coupled to the actuator and is moveable by the actuator between a first member position and a second member position. The actuatable member is typically coupled to the actuator through a connecting assembly. Conventional connecting assemblies in turbochargers include an actuator connecting rod coupled to the actuator and a lever arm coupled to the actuatable member. The actuator connecting rod and the lever arm are typically coupled together through use of a pin. Typical pins in connecting assemblies disadvantageously require retaining rings to fasten the actuator connecting rod, the lever arm, and the pin together. Typical connecting assemblies, therefore, require time consuming and costly processes to assemble the connecting assembly into the turbocharger. In particular, the retaining rings add complexity, cost, and time required for assembly to the connecting assembly. Additionally, retaining rings typically necessitate the connecting assemblies to be assembled during assembly of the turbocharger. For those reasons, the connecting assembly, and thus the turbocharger, are difficult to assemble.

As such, there remains a need to provide an improved connecting assembly for a turbocharger.

SUMMARY OF THE INVENTION AND ADVANTAGES

The present invention provides a connecting assembly actuated by an actuator for controlling flow of exhaust gas from an internal combustion engine by moving an actuatable member. The connecting assembly includes an actuator connecting rod extending along an axis between a first end portion and a second end portion. The second end portion is spaced apart from the first end portion along the axis. The actuator connecting rod defines a rod aperture, and the first end portion of the actuator connecting rod is configured to be coupled to the actuator and is moveable between a first rod position and a second rod position by the actuator.

A lever arm is coupled to the second end portion of the actuator connecting rod. The lever arm defines a lever aperture. The lever arm is configured to be coupled to the wastegate valve and is moveable between a first arm position and a second arm position by the actuator connecting rod to control the flow of exhaust gas.

A pin is coupled to the actuator connecting rod and to the lever arm. The pin has a first pin portion, a second pin portion, and a third pin portion. The first pin portion is disposed in one of the rod aperture of the actuator connecting rod and the lever aperture of the lever arm. The first pin portion has a first diameter. The second pin portion is disposed in the other of the rod aperture of the actuator connecting rod and the lever aperture of the lever arm, extends from the first pin portion, and has a second diameter larger than the first diameter. The third pin portion extends from the second pin portion such that the second pin portion is disposed between the first pin portion and the third pin portion, and has a third diameter larger than the first and second diameters to allow pivotable movement between the actuator connecting rod and the lever arm.

Accordingly, the connecting assembly is advantageously easy to assemble. More specifically, the first, second, and third pin portions result in simple, inexpensive, and quick assembly of the connecting assembly. Additionally, the connecting assembly does not require retaining rings or any additional fasteners to couple the actuator connecting rod, the lever arm, and the pin together. Furthermore, the connecting assembly is able to be assembled independent of the turbocharger, allowing the connecting assembly to be assembled before assembly of the turbocharger, and thus also allowing the connecting assembly to be assembled into the turbocharger altogether. Therefore, assembly of the turbocharger is also advantageously quicker.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
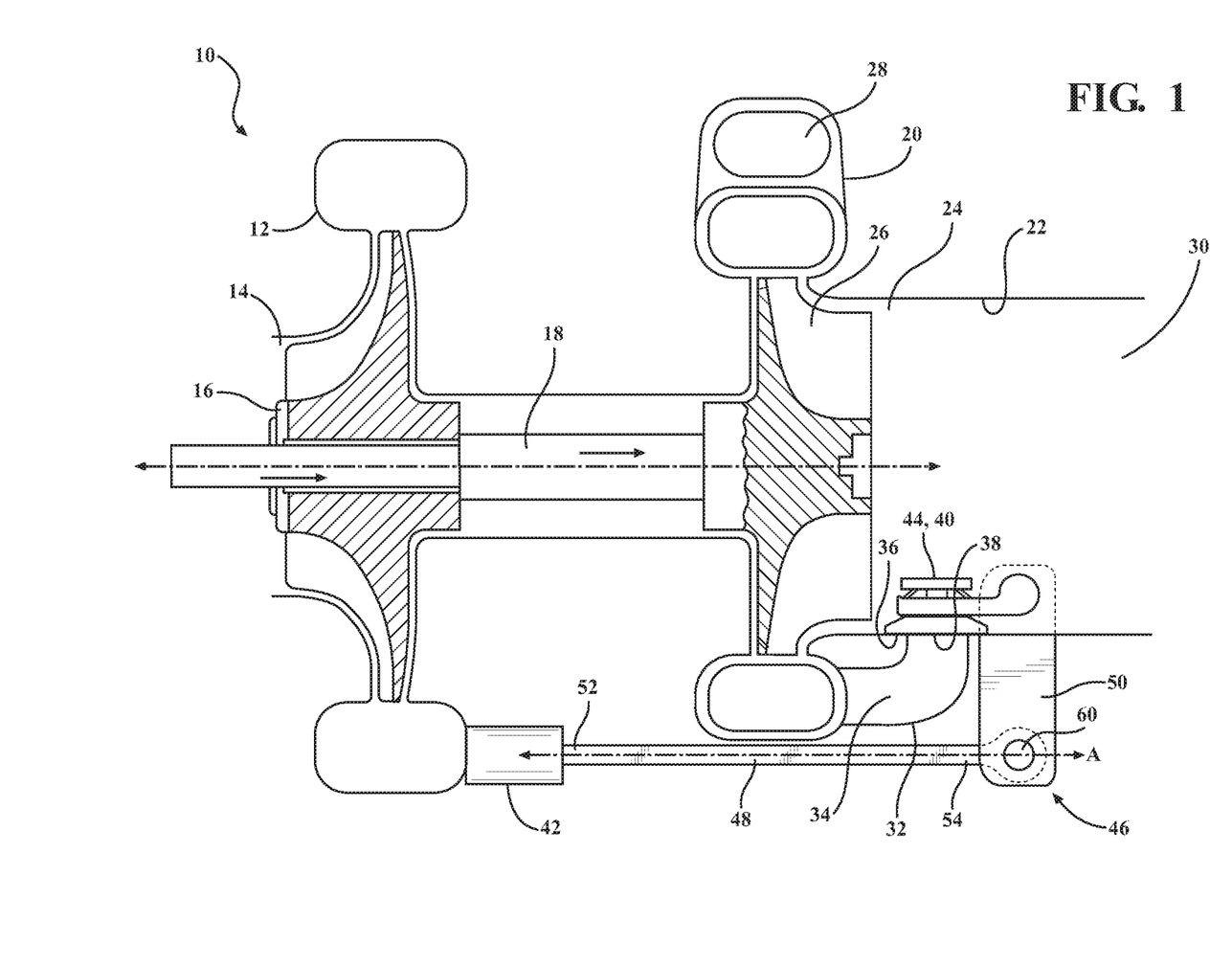
FIG. 1 is a schematic illustration of a turbocharger with a wastegate duct defining a wastegate channel, an actuator, an actuatable member, and a connecting assembly coupling the actuator and the actuatable member, and where the actuatable member is a wastegate valve.

With reference to the Figures, wherein like numerals indicate like parts throughout the several views, a turbocharger 10 is shown schematically in FIG. 1. The turbocharger 10 receives exhaust gas from an internal combustion engine and delivers compressed air to the internal combustion engine. The turbocharger 10 includes a compressor housing 12 defining a compressor housing interior 14, and includes a compressor wheel 16 disposed in the compressor housing interior 14. The turbocharger 10 also includes a shaft 18 coupled to the compressor wheel 16, disposed in the compressor housing interior 14, and rotatable with the compressor wheel 16.

The turbocharger also includes a turbine housing 20 coupled to the compressor housing 12. The turbine housing 20 includes an interior surface 22 defining a turbine housing interior 24, and includes a turbine wheel 26 disposed in the turbine housing interior 24. The turbine wheel 26 is coupled to the shaft 18 and is rotatable with the shaft 18. Specifically, the exhaust gas from the internal combustion engine, which would normally contain wasted energy, is used to drive the turbine wheel 26, which is used to drive the shaft 18 and, in turn, the compressor wheel 16 to deliver compressed air to the internal combustion engine.

The interior surface 22 extends between a turbine housing inlet 28 and a turbine housing outlet 30. The turbine housing inlet 28 is defined at one end of the interior surface 22 and is in fluid communication with the internal combustion engine and the turbine housing interior 24 for delivering exhaust gas from the internal combustion engine to the turbine housing interior 24. The turbine housing outlet 30 is defined at an opposite end of the interior surface 22 and is in fluid communication with the turbine housing interior 24 for discharging exhaust gas from the turbine housing interior 24.

The turbocharger 10 also includes an actuator 42 coupled to the turbine housing 20 and an actuatable member 44 coupled to the actuator 42. The actuator 42 may be directly affixed to the compressor housing 12 while still being coupled to the turbine housing 20. The actuatable member 44 is moveable by the actuator 42 between a first member position and a second member position.

The actuatable member 44 is coupled to the actuator 42 through a connecting assembly 46. The connecting assembly 46 is moveable by the actuator 42 for controlling the flow of exhaust gas from the internal combustion engine. The connecting assembly 46 includes an actuator connecting rod 48 and a lever arm 50. It is to be appreciated that although the connecting assembly 46 is not required to be coupled to the turbocharger 10, a typical embodiment includes the connecting assembly 46.

The actuator connecting rod 48 extends along an axis A between a first end portion 52 and a second end portion 54. The first end portion 52 is spaced apart from the first end portion 52 along the axis A. The actuator connecting rod 48 defines a rod aperture 56, and the actuator connecting rod 48 is coupled to the actuator 42. The actuator connecting rod 48 is moveable between a first rod position and a second rod position by the actuator 42.

The lever arm 50 is coupled to the actuator connecting rod 48. The lever arm 50 defines a lever aperture 58, and the lever arm 50 is coupled to the actuatable member 44. The lever arm 50 is moveable between a first arm position and a second arm position by the actuator connecting rod 48 to control the flow of exhaust gas.

A pin 60 is coupled to the actuator connecting rod 48 and to the lever arm 50. The pin 60 has a first pin portion 62, a second pin portion 64, and a third pin portion 66. The first pin portion 62 is disposed in one of the rod aperture 56 of the actuator connecting rod 48 and the lever aperture 58 of the lever arm 50. In other words, the first pin portion 62 may be disposed in the rod aperture 56 of the actuator connecting rod 48 or may be disposed in the lever aperture 58 of the lever arm 50. Additionally, the first pin portion 62 has a first diameter D1.

The second pin portion 64 is disposed in the other of the rod aperture 56 of the actuator connecting rod 48 and the lever aperture 58 of the lever arm 50. In other words, the second pin portion 64 may be disposed in the rod aperture 56 of the actuator connecting rod 48 or may be disposed in the lever aperture 58 of the lever arm 50 depending on which of the rod aperture 56 and the lever aperture 58 the first pin portion 62 is disposed in. Additionally, the second pin portion extends from the first pin portion 62, and has a second diameter D2 larger than the first diameter D1.

The third pin portion 66 extends from the second pin portion 64 such that the second pin portion 64 is disposed between the first pin portion 62 and the third pin portion 66. The third pin portion 66 has a third diameter D3 larger than the first and second diameters D1, D2 to allow pivotable movement between the actuator connecting rod 48 and the lever arm 50. Said differently, the relationship of diameters between the first pin portion 62, the second pin portion 64, and the third pin portion 66 allows pivotable movement between the actuator connecting rod 48 and the lever arm 50.

The first, second, and third pin portions 62, 64, 66 of the pin 60 form a stepped configuration because the first diameter D1, the second diameter D2, and third diameter D3 progressively increase in discrete steps. The stepped configuration of the pin 60 allows the actuator connecting rod 48 and the lever arm 50 to be assembled with the pin 60 to form the connecting assembly 46 more easily by having the discrete steps (i.e., the first pin portion 64, the second pin portion 64, and the third pin portion 66) for each of the actuator connecting rod 48 and the lever arm 50 to rest against. The actuator connecting rod 48 and the lever arm 50 rest against either a first shoulder 67 defined by a transition from the first diameter D1 to the second diameter D2 or a second shoulder 69 defined by a transition from the second diameter D2 to the third diameter D3.

The third pin portion 66 functions as a first end stop 68 to prevent the one of the actuator connecting rod 48 and the lever arm 50 disposed about the second pin portion 64 from sliding off of the second pin portion 64. Said differently, the larger third diameter D3 of the third pin portion 66 bounds the movement of one of the actuator connecting rod 48 and the lever arm 50. In the illustrated embodiment in FIGS. 2B and 3B where the second pin portion 64 is disposed in the lever aperture 58 of the lever arm 50, the third pin portion 66 prevents the lever arm 50 from moving in a first direction DIR1. In this embodiment, the actuator connecting rod 48 rests against the first shoulder 67 to prevent the actuator connecting rod 48 from moving in the first direction DIR 1 relative to the pin 60 and the lever arm 50 rests against the second shoulder 69 to prevent the lever arm from moving in the first direction DIR 1 relative to the pin 60. In the illustrated embodiment in FIGS. 2A and 3A where the second pin portion 64 is disposed in the rod aperture 56 of the actuator connecting rod 48, the third pin portion 66 prevents the actuator connecting rod 48 from moving in the first direction DIR1. In this embodiment, the lever arm 50 rests against the first shoulder 67 to prevent the lever arm 50 from moving in the first direction DIR 1 relative to the pin 60 and the actuator connecting rod 48 rests against the second shoulder 69 to prevent the actuator connecting rod 48 from moving in the first direction DIR 1 relative to the pin 60.

The first pin portion 62 functions as a second end stop 70 to prevent the one of the actuator connecting rod 48 and the lever arm 50 disposed about the second pin portion 64 from sliding off of the second pin portion 64. Said differently, the first pin portion 62 bounds the movement of one of the actuator connecting rod 48 and the lever arm 50. In the embodiments where the second pin portion 64 is disposed in the lever aperture 58 of the lever arm 50, the first pin portion 62 prevents the lever arm 50 from moving in a second direction DIR2 opposite the first direction DIR1. In the embodiments where the second pin portion 64 is disposed in the rod aperture 56 of the actuator connecting rod 48, the first pin portion 62 prevents the actuator connecting rod 48 from moving in the second direction DIR2. It is to be appreciated that the actuator connecting rod 48 and the lever arm 50 may move slightly in the first direction DIR 1 or the second direction DIR 2 depending on dimensional tolerances of the actuator connecting rod 48, the lever arm 50, and the pin 60, among other factors.

Because the second pin portion 64 is disposed in one of the rod aperture 56 of the actuator connecting rod 48 and the lever aperture 58 of the lever arm 50, and is bounded by the first end stop 68 and by the second end stop 70, the connecting assembly 46 allows pivotable movement between the actuator connecting rod 48 and the wastegate valve 44. In other words, one of the lever arm 50 and the actuator connecting rod 48 pivots about the pin 60 relative to the other of the lever arm 50 and the actuator connecting rod 48.

In the embodiment where the second pin portion 64 is disposed in the rod aperture 56 of the actuator connecting rod 48, the actuator connecting rod 48 pivots relative to the lever arm 50 about the pin 60. In the embodiment where the second pin portion 64 is disposed in the lever aperture 58 of the lever arm 50, the lever arm 50 pivots relative to the actuator connecting rod 48 about the pin 60. When the actuator 42 moves the actuator connecting rod 48 along the axis A, the lever arm 50 and the actuator connecting rod 48 pivot relative to one another about the pin 60, and the lever arm 50 then moves the actuatable member 44 either from the first member position to the second member position.

Accordingly, the connecting assembly 46 advantageously is easy to assemble. More specifically, the first, second, and third pin portions 62, 64, 66 enable simple, inexpensive, and quick assembly of the connecting assembly 46 because the third pin portion 66 functions as the first end stop 68, the second pin portion 64 allows pivotable movement between the actuator connecting rod 48 and the lever arm 50, and the first pin portion 62 functions as the second end stop 70. The first and second end stops 68, 70 are included in the pin 60 itself, allowing the connecting assembly 46 to be assembled with fewer components which results in simple, inexpensive, and quick assembly.

Additionally, the connecting assembly 46 does not require retaining rings or any additional fasteners to couple the actuator connecting rod 48, the lever arm 50, and the pin 60 together because the third pin portion 66 functions as the first end stop 68 and the first pin portion 62 functions as the second end stop 70, thus bounding one of the actuator connecting rod 48 and the lever arm 50 to the pin 60. As such, the connecting assembly 46 does not require retaining rings or any additional fasteners to function as either the first or second end stops 68, 70. Moreover, in certain embodiments, the connecting assembly 46 is free of any retaining rings. Furthermore, the connecting assembly 46 is able to be assembled independently of the turbocharger 10, allowing the connecting assembly 46 to be assembled before assembly of the turbocharger 10, and thus also allowing the connecting assembly 46 to be assembled into the turbocharger 10 altogether. Therefore, overall assembly of the turbocharger 10 is also advantageously quicker.

The actuatable member 44 may be any number of components within the turbocharger 10. Additionally, it is contemplated that the connecting assembly 46 and the actuatable member 44 may be used in applications outside of a turbocharger 10, including in other vehicle applications such as exhaust gas recirculation valves or other valves in emissions of the exhaust gas.

Although not required, in one embodiment, the turbocharger 10 may include a wastegate duct 32 disposed downstream of the turbine housing inlet 28. The wastegate duct 32 defines a wastegate channel 34 in fluid communication with the turbine housing inlet 28. The wastegate channel 34 discharges exhaust gas from the turbine housing inlet 28 by bypassing the turbine housing interior 24. In this embodiment, a valve seat 36 is disposed about the wastegate channel 34 at a channel outlet 38 of the wastegate channel 34. Additionally, in this embodiment, the actuatable member 44 is a wastegate valve 40. The wastegate valve 40 is engaged with the valve seat 36 in the first member position to prevent the flow of exhaust gas through the wastegate channel 34, and the wastegate valve 40 is disengaged from the valve seat 36 in the second member position to allow the flow of exhaust gas through the wastegate channel 34.

The wastegate valve 40 may be of any design including, but not limited to, a first embodiment, a second embodiment, and a third embodiment. In the first embodiment, the wastegate valve 40 has a valve body, a valve shaft extending away from the valve body, a spindle arm coupled to the valve shaft, a washer coupled to the valve shaft such that the spindle arm is secured to the valve body, and a washer disposed between the spindle arm and the washer. In the second embodiment, the wastegate valve 40 is of a single piece construction, with the spindle and the valve body formed integral with one another. In the third embodiment, the wastegate valve 40 is initially of a two-piece construction, with the valve body and the spindle arm being formed separately, but which are later joined to form a single piece construction.

In another embodiment, the actuatable member 44 is a variable turbine geometry (VTG) device disposed in the turbocharger 10 and configured to alter the flow of exhaust gas through the turbine housing interior 24. The variable turbine geometry (VTG) device may have a unison ring disposed about the turbine wheel 26 and having a plurality of vanes. In this embodiment, the actuatable member is the unison ring and/or the plurality of vanes. The unison ring and the plurality of vanes are closed in the first member position to restrict the flow of exhaust gas through the turbine housing interior 24, and are open in the second member position to allow the flow of exhaust gas through the turbine housing interior 24 unrestricted.

In yet another embodiment, the actuatable member 44 is a bypass valve disposed outside of the turbine housing 20 and configured to divert flow around the turbocharger 10. The bypass valve has a blocking mechanism configured to block flow of exhaust gas around the turbocharger. In this embodiment, the actuatable member is the blocking mechanism. The blocking mechanism is closed in the first member position to prevent the flow of exhaust gas from being diverted around the turbocharger 10 and thus directs the flow of the exhaust gas through the turbine housing interior 24. The blocking mechanism is open in the second member position to allow the flow of exhaust gas to be diverted around the turbocharger 10, and thus around the turbine housing interior 24. It is to be appreciated that the bypass valve can be used with the turbocharger 10 in conjunction with either a second turbocharger or a compressor to bypass either the turbocharger 10, the second turbocharger, or the compressor.

The first pin portion 62, the second pin portion 64, and the third pin portion 66 may be integral with one another. Said differently, the first, second, and third pin portions 62, 64, 66 may be cast or otherwise formed together. Alternatively, the first, second, and third pin portions 62, 64, 66 may be formed separately and later joined to become integral. In the embodiments where the first, second, and third pin portions 62, 64, 66 are integral with one another, the pin 60 is a single component. Because the connecting assembly 46 does not require any retaining rings or any other fasteners, only the single component (i.e., only the pin 60) is necessary to couple the actuator connecting rod 48 and the lever arm 50 together to form the connecting assembly 46. As such, the assembly of the connecting assembly 46 is further simplified, further reduced in cost, and is further able to be assembled quickly.

The first pin portion 62 is fixed to one of the actuator connecting rod 48 and the lever arm 50. In the embodiment where the first pin portion 62 is disposed in the rod aperture 56 of the actuator connecting rod 48, the first pin portion 62 is fixed to the actuator connecting rod 48 and prevented from rotating. In the embodiment where the first pin portion 62 is disposed in the lever aperture 58 of the lever arm 50, the first pin portion 62 is fixed to the lever arm 50 and prevented from rotating. In the embodiments where the first pin portion 62 is fixed, the connecting assembly 46 is held together more reliably as compared to connecting assemblies 46 utilizing a retaining ring. In other words, when the first pin portion 62 is fixed, the first pin portion 62 is more reliably held to the actuator connecting rod 48 and to the lever arm 50.

The second diameter D2 of the second pin portion 64 may be between 1.1 and 2.0 times larger than the first diameter D1 of the first pin portion 62. It is to be appreciated that this range of diameters is only exemplary. The range of the first diameter D1 and the second diameter D2 could even fall outside of this range. Said differently, the second diameter D2 of the second pin portion 64 could be more than 2.0 times larger than the first diameter D1 of the first pin portion 62, or the second diameter D2 of the second pin portion 64 could be less than 1.1 times larger than the first diameter D1 of the first pin portion 62. In another embodiment, the second diameter D2 of the second pin portion 64 is between 1.3 and 1.7 times larger than the first diameter D1 of the first pin portion 62. It is to be appreciated that the range of diameters in this embodiment is also only exemplary, and the range of the first diameter D1 and the second diameter D2 could fall outside of this range.

In the embodiments where the particular ratio of the first diameter D1 and the second diameter D2 is on the higher end of the range of the first diameter D1 and the second diameter D2, the actuator connecting rod 48 and the lever arm 50 are prevented from moving relative to one another. As a non-limiting example, in the embodiment where the first pin portion 62 is disposed in the lever aperture 58 of the lever arm 50 and the particular ratio of the first diameter D1 and the second diameter D2 is high, the second pin portion 64 is prevented from being disposed in the lever aperture 58 of the lever arm 50 and the first pin portion 62 is prevented from being disposed in the rod aperture 56 of the actuator connecting rod 48. In other words, the relative locations of the first and second pin portions 62, 64 compared to the lever arm 50 and the actuator connecting rod 48 are better defined, and the relative locations are less likely to be subverted.

Additionally, in the embodiments where the particular ratio of the first diameter D1 and the second diameter D2 is on the lower end of the range of the first diameter D1 and the second diameter D2, the first pin portion 62 has a larger surface area over which the first pin portion 62 is fixed to either the lever arm 50 or the actuator connecting rod 48. This larger surface area over which the first pin portion 62 is fixed advantageously results in a stronger and more reliable fixation of the pin 60 to either the lever arm 50 or the actuator connecting rod 48. This larger surface area over which the first pin portion 62 is fixed also results in the first pin portion 62 acting more reliably as the second end stop 70. The exact ratio of the first diameter D1 of the first pin portion 62 to the second diameter D2 of the second pin portion 64 will result from a balancing of the above factors, among other factors.

The third diameter D3 of the third pin portion 66 may be between 1.1 and 3.0 times larger than the second diameter D2 of the second pin portion 64. It is to be appreciated that this range of diameters is only exemplary. The range of the second diameter D2 and the third diameter D3 could even fall outside of this range. Said differently, the third diameter D3 of the third pin portion 66 could be more than 3.0 times larger than the second diameter D2 of the second pin portion 64, or the third diameter D3 of the third pin portion 66 could be less than 1.1 times larger than the second diameter D2 of the second pin portion 64. In another embodiment, the third diameter D3 of the third pin portion 66 is between 1.5 and 2.5 times larger than the second diameter D2 of the second pin portion 64. It is to be appreciated that the range of diameters in this embodiment is also only exemplary, and the range of the second diameter D2 and the third diameter D3 could fall outside of this range.

In the embodiments where the particular ratio of the second diameter D2 and the third diameter D3 is on the higher end of the range of the second diameter D2 and the third diameter D2, the third pin portion 66 acts more reliably as the first end stop 68, and the second pin portion 64 of the pin 60 is better prevented from slipping out of either the rod aperture 56 of the actuator connecting rod 48 or the lever aperture 58 of the lever arm 50.

Additionally, in the embodiments where the particular ratio of the second diameter D2 and the third diameter D3 is on the lower end of the range of the second diameter D2 and the third diameter D3, the third pin portion 66 advantageously is smaller and is lighter weight. In other words, in the embodiments where the particular ratio is on the lower end of the range of the second diameter D2 and the third diameter D3, the connecting assembly 46 is lightweight. The exact ratio of the second diameter D2 of the second pin portion 64 to the third diameter D3 of the third pin portion 66 will result from a balancing of the above factors, among other factors.

Figure 2A:
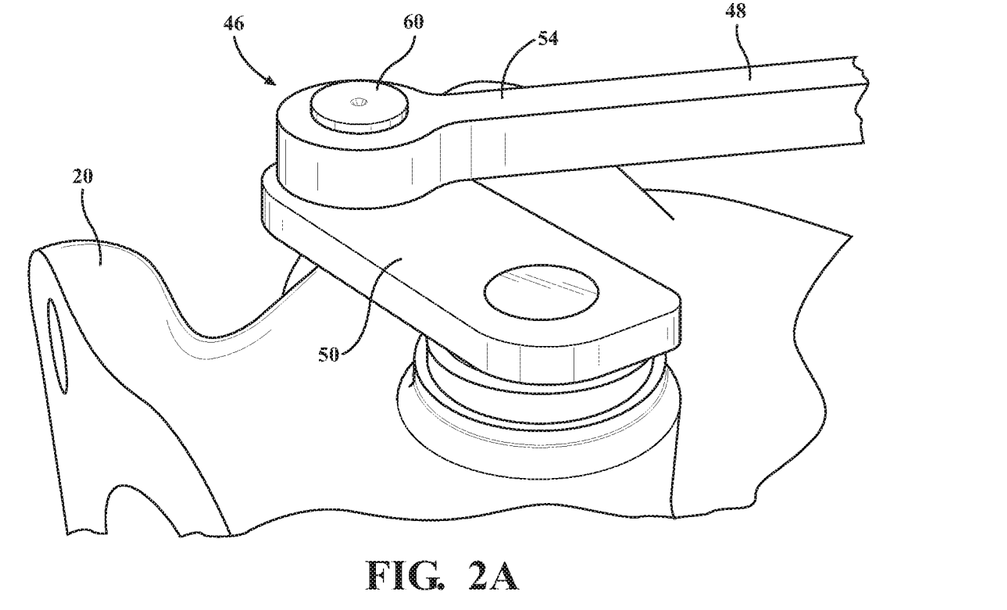
FIG. 2A is a perspective view of the connecting assembly having an actuator connecting rod defining a rod aperture, a lever arm defining a lever aperture, and a pin coupled to the actuator connecting rod and to the lever arm.
Figure 3A:
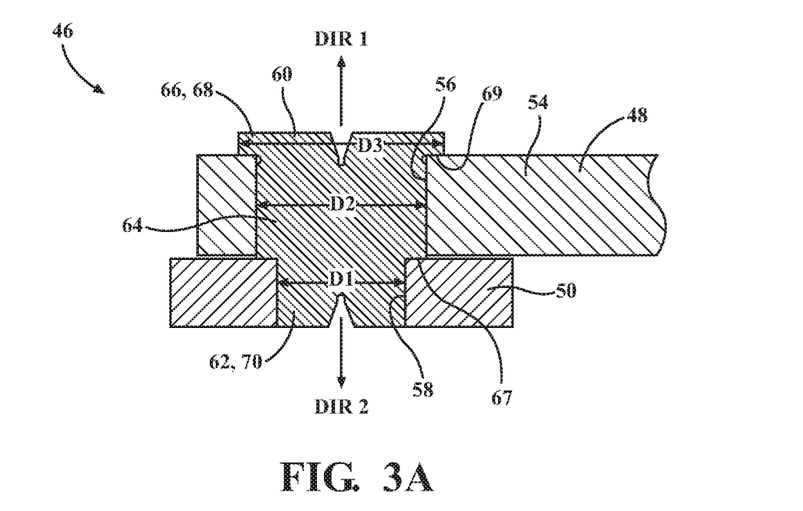
FIG. 3A is a cross-sectional view of the connecting assembly in FIG. 2A, with the pin having a first pin portion disposed in the lever aperture of the lever arm and having a first diameter, a second pin portion disposed in the rod aperture of the actuator connecting rod and having a second diameter larger than the first diameter, and a third pin portion extending from the second pin portion and having a third diameter larger than the first and second diameters.

In one embodiment, as shown in FIGS. 2A and 3A, the first pin portion 62 is disposed in the lever aperture 58 of the lever arm 50 and the second pin portion 64 is disposed in the rod aperture 56 of the actuator connecting rod 48 to allow pivotable movement between the actuator connecting rod 48 and the lever arm 50.

Figure 2B:
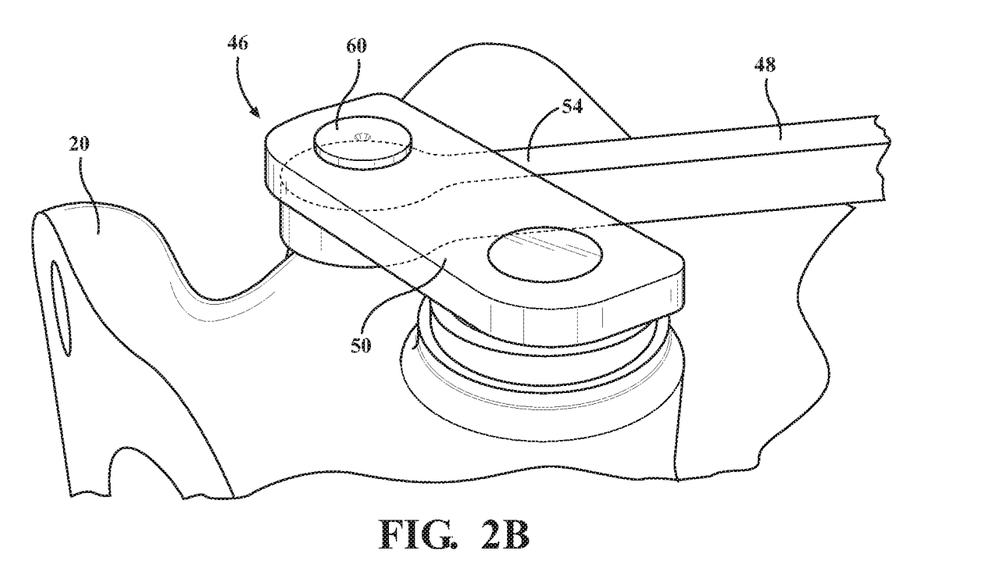
FIG. 2B is a perspective view, shown partly in phantom, of the connecting assembly having an actuator connecting rod defining a rod aperture, a lever arm defining a lever aperture, and a pin coupled to the actuator connecting rod and to the lever arm.
Figure 3B:
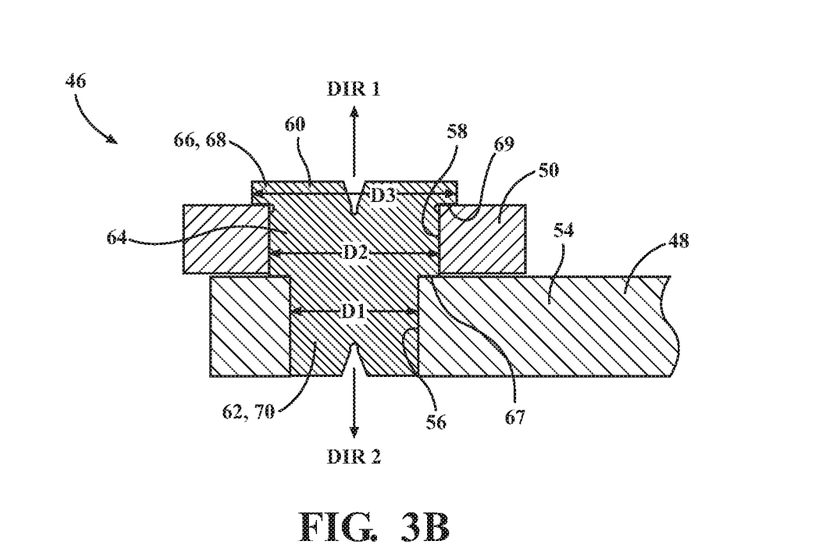
FIG. 3B is a cross-sectional view of the connecting assembly in FIG. 3A, with the pin having a first pin portion disposed in the rod aperture of the actuator connecting rod and having a first diameter, a second pin portion disposed in the lever aperture of the lever arm and having a second diameter larger than the first diameter, and a third pin portion extending from the second pin portion and having a third diameter larger than the first and second diameters.

In another embodiment, as shown in FIGS. 2B and 3B, the first pin portion 62 is disposed in the rod aperture 56 of the actuator connecting rod 48 and the second pin portion 64 is disposed in the lever aperture 58 of the lever arm 50 to allow pivotable movement between the actuator connecting rod 48 and the lever arm.

Figure 4A:
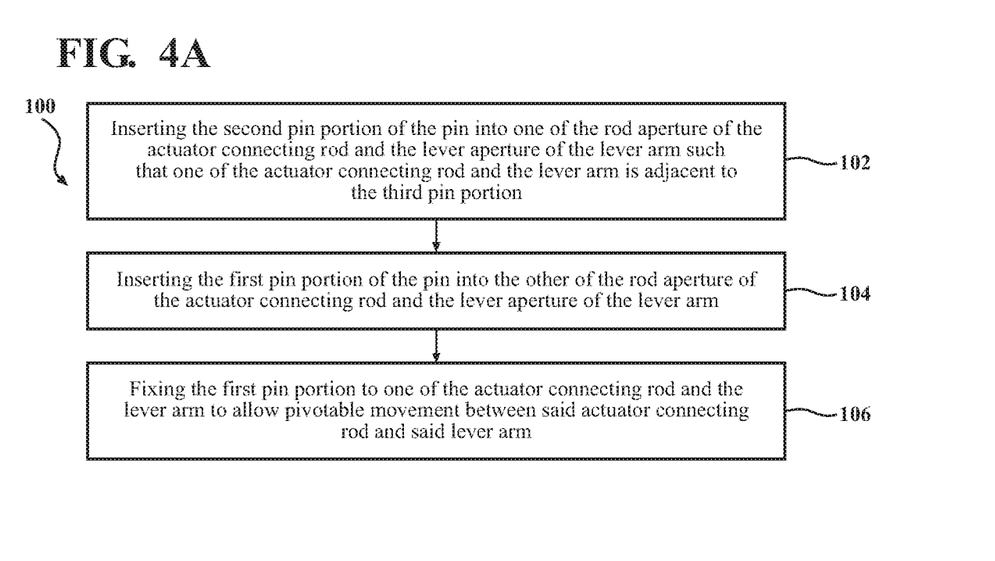
FIG. 4A is a flowchart of a method of assembling a connecting assembly including the steps of inserting the second pin portion of the pin into one of the rod aperture of the actuator connecting rod and the lever aperture of the lever arm such that the one of the actuator connecting rod and the lever arm is adjacent to the third pin portion, inserting the first pin portion of the pin into the other of the rod aperture of the actuator connecting rod and the lever aperture of the lever arm, and fixing the first pin portion to one of the actuator connecting rod and the lever arm to allow pivotable movement between the actuator connecting rod and the lever arm.

With reference to FIGS. 4A-4F, a method 100 of assembling the connecting assembly 46 includes the step of inserting the second pin portion 64 of the pin 60 into one of the rod aperture 56 of the actuator connecting rod 48 and the lever aperture 58 of the lever arm 50 such that one of the actuator connecting rod 48 and the lever arm 50 is adjacent to the third pin portion 66, as indicated by block 102 in FIG. 4A. The method 100 further includes the step of inserting the first pin portion 62 of the pin 60 into the other of the rod aperture 56 of the actuator connecting rod 48 and the lever aperture 58 of the lever arm 50, as indicated by block 104 in FIG. 4A. The method 100 additionally includes the step of fixing the first pin portion 62 to one of the actuator connecting rod 48 and the lever arm 50 to allow pivotable movement between the actuator connecting rod 48 and the lever arm 50, as indicated by block 106 in FIG. 4A.

Either the actuator connecting rod 48 or the lever arm 50 may be adjacent to the third pin portion 66. In the embodiments where the second pin portion 64 is disposed in the lever aperture 58 of the lever arm 50, the lever arm 50 is adjacent to the third pin portion 66. The lever arm 50 need not be in contact with and need not be able to be in contact with the third pin portion 66 to be adjacent to the third pin portion 66. Additionally, there may be additional components between the lever arm 50 and the third pin portion 66 while the lever arm 50 is adjacent to the third pin portion 66. The lever arm 50 need only be near enough to the third pin portion 66 that the lever arm 50 and the third portion are in close proximity to one another.

In the embodiments where the second pin portion 64 is disposed in the rod aperture 56 of the actuator connecting rod 48, the actuator connecting rod 48 is adjacent to the third pin portion 66. The actuator connecting rod 48 need not be in contact with and need not be able to be in contact with the third pin portion 66 to be adjacent to the third pin portion 66. Additionally, there may be additional components between the actuator connecting rod 48 and the third pin portion 66 while the actuator connecting rod 48 is adjacent to the third pin portion 66. The lever arm 50 need only be near enough to the third pin portion 66 that the actuator connecting rod 48 and the third portion are in close proximity to one another.

The step of fixing 106 the first pin portion 62 may be done through a variety of techniques including welding, brazing, soldering, press-fitting or any other interference fit. The step of fixing 106 advantageously results in simple, inexpensive, and quick assembly of the connecting assembly 46. The step of fixing 106 the first pin portion 62 also results in the connecting assembly 46 being held together more reliably as compared to connecting assemblies 46 utilizing a retaining ring.

More specifically, the step of fixing 106 the first pin portion 62 eliminates the need for other more complex, costly, and time consuming processes such as using a retaining ring. The step of fixing 106 the first pin portion 62 also allows the connecting assembly 46 to be assembled before installation into a turbocharger 10 because no further retention or use of any fasteners is necessary.

Figure 4B:
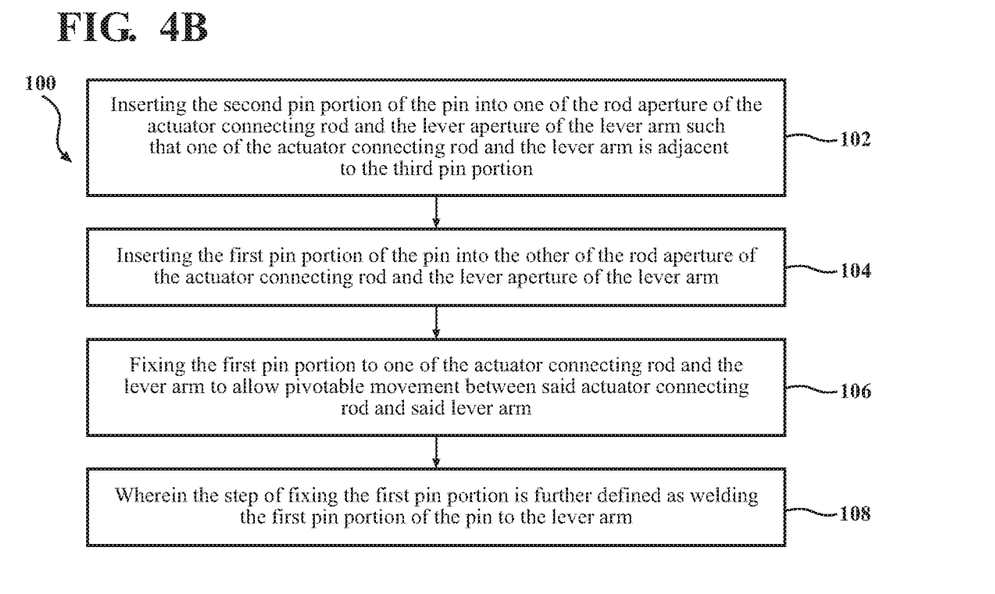
FIG. 4B is a flowchart of the method of FIG. 4A, wherein the step of fixing the first pin portion is further defined as welding the first pin portion of the pin to the lever arm.
Figure 4C:
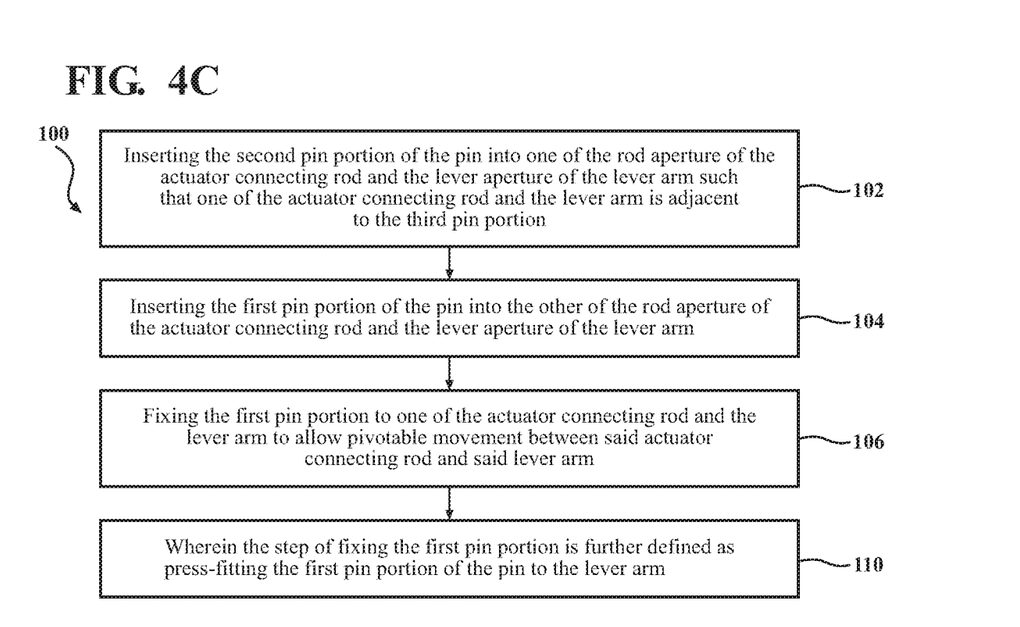
FIG. 4C is a flowchart of the method of FIG. 4A, wherein the step of fixing the first pin portion is further defined as press-fitting the first pin portion of the pin to the lever arm.
Figure 4D:
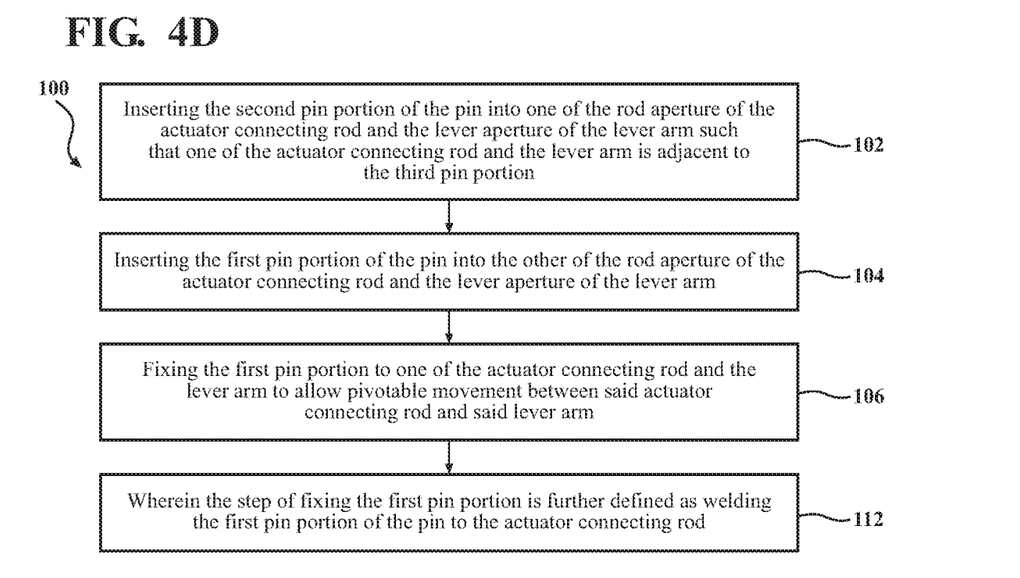
FIG. 4D is a flowchart of the method of FIG. 4A, wherein the step of fixing the first pin portion is further defined as welding the first pin portion of the pin to the actuator connecting rod.
Figure 4E:
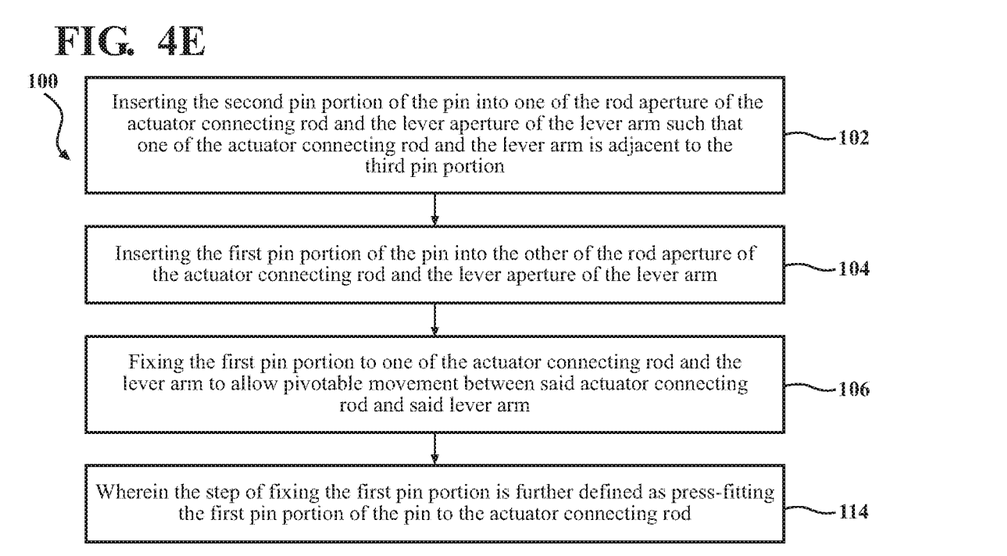
FIG. 4E is a flowchart of the method of FIG. 4A, wherein the step of fixing the first pin portion is further defined as press-fitting the first pin portion of the pin to the actuator connecting rod.

In one embodiment, as shown in FIG. 4B indicated by block 108, the step of fixing 106 the first pin portion 62 is further defined as welding the first pin portion 62 of the pin 60 to the lever arm 50. In another embodiment, as shown in FIG. 4C indicated by block 110, the step of fixing 106 the first pin portion 62 is further defined as press-fitting the first pin portion 62 of the pin 60 to the lever arm 50. In yet another embodiment, as shown in FIG. 4D indicated by block 112, the step of fixing 106 the first pin portion 62 is further defined as welding the first pin portion 62 of the pin 60 to the actuator connecting rod 48. In a different embodiment, as shown in FIG. 4E indicated by block 114, the step of fixing 106 the first pin portion 62 is further defined as press-fitting the first pin portion 62 of the pin 60 to the actuator connecting rod 48.

Figure 4F:
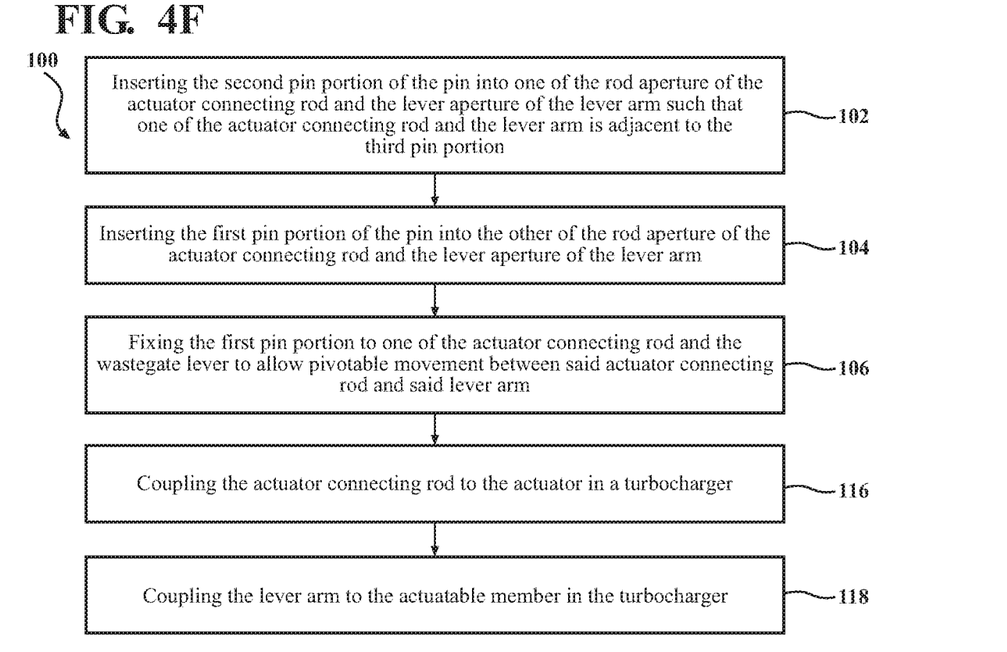
FIG. 4F is a flowchart of the method of FIG. 4A further comprising the steps of coupling the actuator connecting rod to the actuator in the turbocharger, and coupling the lever arm to the actuatable member in the turbocharger.

The method 100 may further include a step of coupling the actuator connecting rod 48 to the actuator 42 in the turbocharger 10, as indicated by block 116 in FIG. 4F. The method 100 may also further include a step of coupling the lever arm 50 to the actuatable member 44 in the turbocharger 10, as indicated by block 118 in FIG. 4F. Assembly of the connecting assembly 46 into the turbocharger 10 need not be done at the same time as assembly of the connecting assembly 46 itself. In other words, the step 116 of coupling the actuator connecting rod 48 to the actuator 42 and the step 118 of coupling the lever arm 50 to the actuatable member 44 may be done after the step 106 of fixing the first pin portion 62 to one of the actuator connecting rod 48 and the lever arm 50. This order of steps results in quicker assembly of the connecting assembly 46 into the turbocharger 10. Alternatively, the step 116 of coupling the actuator connecting rod 48 to the actuator 42 and the step 118 of coupling the lever arm 50 to the actuatable member 44 may be done concurrently or before the step 106 of fixing the first pin portion 62 to one of the actuator connecting rod 48 and the lever arm 50.

It is to be appreciated that various components of the connecting assembly 46 and the turbocharger 10, and dimensions of the various components of the connecting assembly 46 and the turbocharger 10, are merely illustrative and may not be drawn to scale. The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A connecting assembly moveable by an actuator for controlling flow of exhaust gas from an internal combustion engine by moving an actuatable member, said connecting assembly comprising:
   an actuator connecting rod extending along an axis between a first end portion and a second end portion, wherein said second end portion is spaced apart from said first end portion along said axis, said actuator connecting rod defines a rod aperture, and said first end portion of said actuator connecting rod is configured to be coupled to the actuator and is moveable between a first rod position and a second rod position by the actuator;
   a lever arm coupled to said second end portion of said actuator connecting rod, wherein said lever arm defines a lever aperture, is configured to be coupled to the actuatable member, and is moveable between a first arm position and a second arm position by said actuator connecting rod to control the flow of exhaust gas; and
   a pin coupled to said actuator connecting rod and to said lever arm, said pin having;
      a first portion of said pin disposed in one of said rod aperture of said actuator connecting rod and said lever aperture of said lever arm, and having a first diameter,
      a second portion of said pin disposed in the other of said rod aperture of said actuator connecting rod and said lever aperture of said lever arm, extending from said first portion of said pin, and having a second diameter larger than said first diameter, and
      a third portion of said pin extending from said second portion of said pin such that said second portion of said pin is disposed between said first portion of said pin and said third portion of said pin, and having a third diameter larger than said first and second diameters to allow pivotable movement between said actuator connecting rod and said lever arm.

2. The connecting assembly as set forth in claim 1, wherein said first portion of said pin, said second portion of said pin, and said third portion of said pin are integral with one another.

3. The connecting assembly as set forth in claim 1, wherein said first portion of said pin is fixed to one of said actuator connecting rod and said lever arm.

4. The connecting assembly as set forth in claim 1, wherein said second diameter of said second portion of said pin is between 1.1 and 2.0 times larger than said first diameter of said first portion of said pin.

5. The connecting assembly as set forth in claim 1, wherein said third diameter of said third portion of said pin is between 1.1 and 3.0 times larger than said second diameter of said second portion of said pin.

6. The connecting assembly as set forth in claim 1, wherein said first portion of said pin is disposed in said lever aperture of said lever arm and said second portion of said pin is disposed in said rod aperture of said actuator connecting rod to allow pivotable movement between said actuator connecting rod and said lever arm.

7. The connecting assembly as set forth in claim 1, wherein said first portion of said pin is disposed in said rod aperture of said actuator connecting rod and said second portion of said pin is disposed in said lever aperture of said lever arm to allow pivotable movement between said actuator connecting rod and said lever arm.

8. The connecting assembly as set forth in claim 1, wherein said connecting assembly is disposed in a turbocharger and the actuatable member is a wastegate valve.

9. A turbocharger for delivering compressed air to an internal combustion engine and for receiving exhaust gas from the internal combustion engine, said turbocharger comprising:
   a turbine housing comprising:
      an interior surface defining a turbine housing interior, said interior surface extending between:
         a turbine housing inlet defined at one end of said interior surface and in fluid communication with the internal combustion engine and said turbine housing interior for delivering exhaust gas from the internal combustion engine to said turbine housing interior; and
         a turbine housing outlet defined at an opposite end of said interior surface and in fluid communication with said turbine housing interior for discharging exhaust gas from said turbine housing interior;
   an actuator coupled to said turbine housing;
   an actuatable member coupled to said actuator and moveable by said actuator between a first member position and a second member position; and
   a connecting assembly moveable by said actuator for controlling flow of the exhaust gas from the internal combustion engine by moving said actuatable member, said connecting assembly comprising:
      an actuator connecting rod extending along an axis between a first end portion and a second end portion, wherein said second end portion is spaced apart from said first end portion along said axis, said actuator connecting rod defines a rod aperture, and said first end portion of said actuator connecting rod is coupled to said actuator and is moveable between a first rod position and a second rod position by said actuator;

a lever arm coupled to said second end portion of said actuator connecting rod, wherein said lever arm defines a lever aperture, is coupled to said actuatable member, and is moveable between a first arm position and a second arm position by said actuator connecting rod to control the flow of exhaust gas; and a pin coupled to said actuator connecting rod and to said lever arm, said pin having;

a first portion of said pin disposed in one of said rod aperture of said actuator connecting rod and said lever aperture of said lever arm, and having a first diameter, a second portion of said pin disposed in the other of said rod aperture of said actuator connecting rod and said lever aperture of said lever arm, extending from said first portion of said pin, and having a second diameter larger than said first diameter, and a third portion of said pin extending from said second portion of said pin such that said second portion of said pin is disposed between said first portion of said pin and said third portion of said pin, and having a third diameter larger than said first and second diameters to allow pivotable movement between said actuator connecting rod and said lever arm.

10. The turbocharger as set forth in claim 9 further comprising:

a wastegate duct disposed downstream of said turbine housing inlet and defining a wastegate channel in fluid communication with said turbine housing inlet for discharging exhaust gas from said turbine housing inlet by bypassing said turbine housing interior; and a valve seat disposed about said wastegate channel at a channel outlet of said wastegate channel;

wherein said actuatable member is a wastegate valve, and said wastegate valve is engaged with said valve seat in said first member position to prevent the flow of exhaust gas through said wastegate channel, and said wastegate valve is disengaged from said valve seat in said second member position to allow the flow of exhaust gas through said wastegate channel.

11. The turbocharger as set forth in claim 9, wherein said first portion of said pin, said second portion of said pin, and said third portion of said pin are integral with one another.

12. The turbocharger as set forth in claim 9, wherein said first portion of said pin is fixed to one of said actuator connecting rod and said lever arm.

13. The turbocharger as set forth in claim 9, wherein said second diameter of said second portion of said pin is between 1.1 and 2.0 times larger than said first diameter of said first portion of said pin.

14. The turbocharger as set forth in claim 9, wherein said third diameter of said third portion of said pin is between 1.1 and 3.0 times larger than said second diameter of said second portion of said pin.

15. The turbocharger as set forth in claim 9, wherein said first portion of said pin is disposed in said lever aperture of said lever arm and said second portion of said pin is disposed in said rod aperture of said actuator connecting rod to allow pivotable movement between said actuator connecting rod and said lever arm.

16. The turbocharger as set forth in claim 9, wherein said first portion of said pin is disposed in said rod aperture of said actuator connecting rod and said second portion of said pin is disposed in said lever aperture of said lever arm to allow pivotable movement between said actuator connecting rod and said lever arm.

17. A method of assembling a connecting assembly including an actuator connecting rod defining a rod aperture and configured to couple to an actuator, a lever arm defining a lever aperture and configured to couple to an actuatable member, and a pin coupling the actuator connecting rod to the lever arm, with the pin having a first portion of the pin having a first diameter, a second portion of the pin extending from the first portion of the pin and having a second diameter larger than the first diameter, and a third portion of the pin extending from the second portion of the pin and having a third diameter larger than the first and second diameters, said method comprising:

inserting the second portion of the pin into one of the rod aperture of the actuator connecting rod and the lever aperture of the lever arm such that one of the actuator connecting rod and the lever arm is adjacent to the third portion of the pin;

inserting the first portion of the pin into the other of the rod aperture of the actuator connecting rod and the lever aperture of the lever arm; and fixing the first portion of the pin to one of the actuator connecting rod and the lever arm to allow pivotable movement between the actuator connecting rod and the lever arm.

18. The method as set forth in claim 17, wherein the step of fixing the first portion of the pin is further defined as welding the first portion of the pin to the lever arm.

19. The method as set forth in claim 17, wherein the step of fixing the first portion of the pin is further defined as press-fitting the first portion of the pin to the lever arm.

20. The method as set forth in claim 17, wherein the step of fixing the first portion of the pin is further defined as welding the first portion of the pin to the actuator connecting rod.

21. The method as set forth in claim 17, wherein the step of fixing the first portion of the pin is further defined as press-fitting the first portion of the pin to the actuator connecting rod.

22. The method as set forth in claim 17 further comprising the steps of:

coupling the actuator connecting rod to the actuator in a turbocharger; and coupling the lever arm to the actuatable member in the turbocharger.

* * * * *